Figure 1:
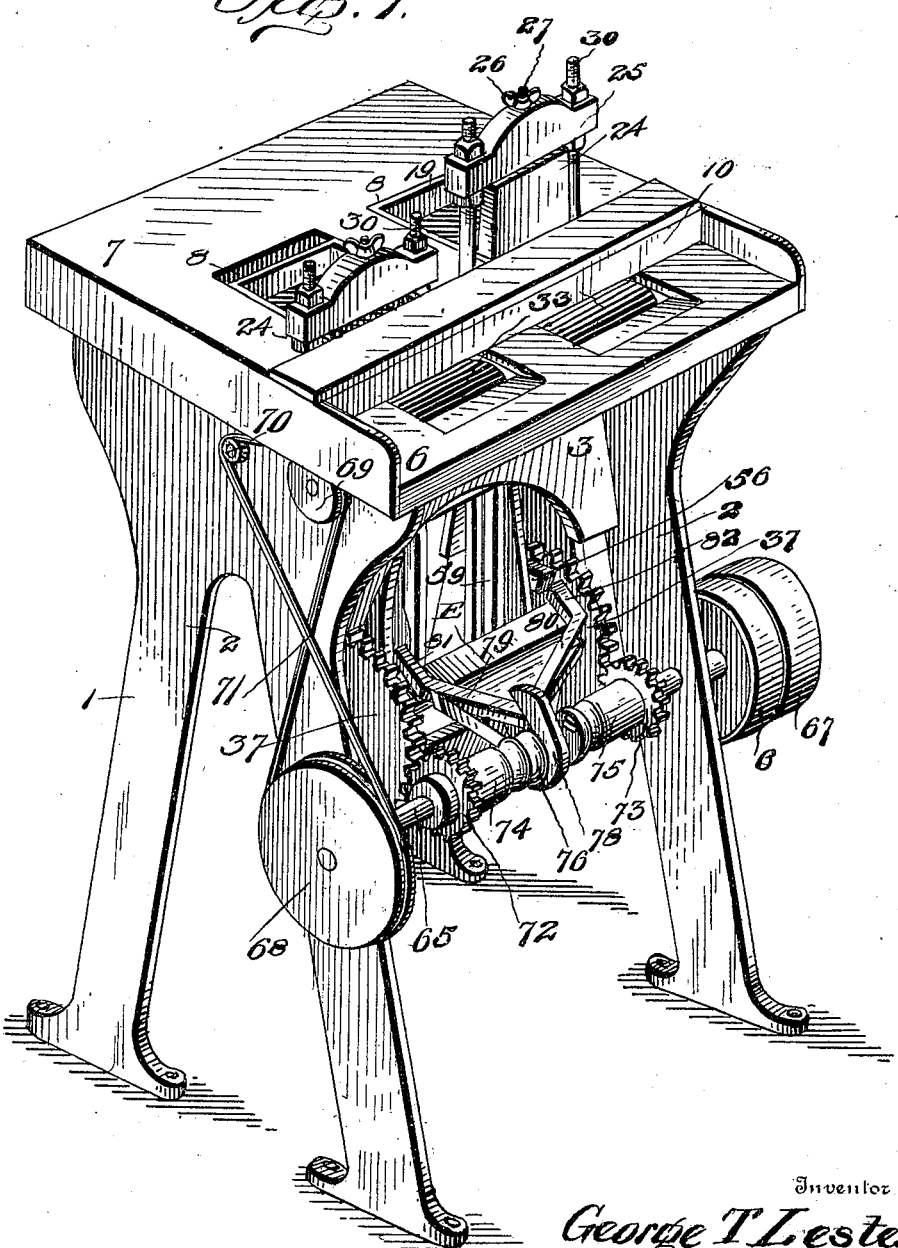

No. 683,951. Patented Oct. 8, 1901.
G. T. LESTER.
PLUG TOBACCO MACHINE.
(Application filed May 21, 1901.)

(No Model.) 9 Sheets—Sheet 1.

Witnesses
Inventor
George T. Lester
By
Attorneys

No. 683,951. Patented Oct. 8, 1901.
G. T. LESTER.
PLUG TOBACCO MACHINE.
(Application filed May 21, 1901.)
(No Model.) 9 Sheets—Sheet 2.
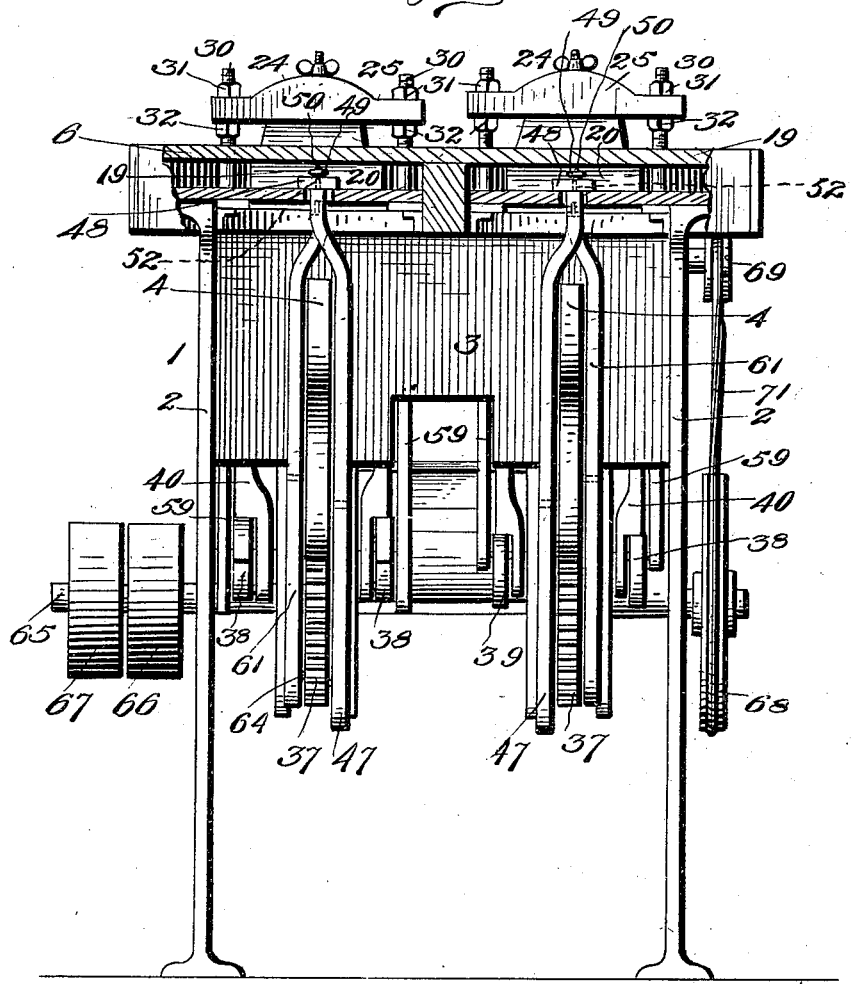
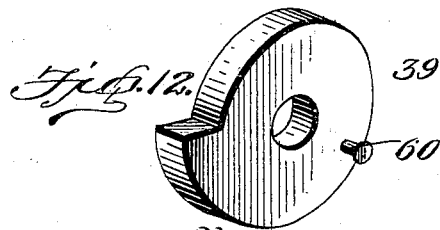
Witnesses
Inventor
George T. Lester
By H. B. Willson & Co.
Attorneys No. 683,951. Patented Oct. 8, 1901.
G. T. LESTER.
PLUG TOBACCO MACHINE.
(Application filed May 21, 1901.)
(No Model.) 9 Sheets—Sheet 3.
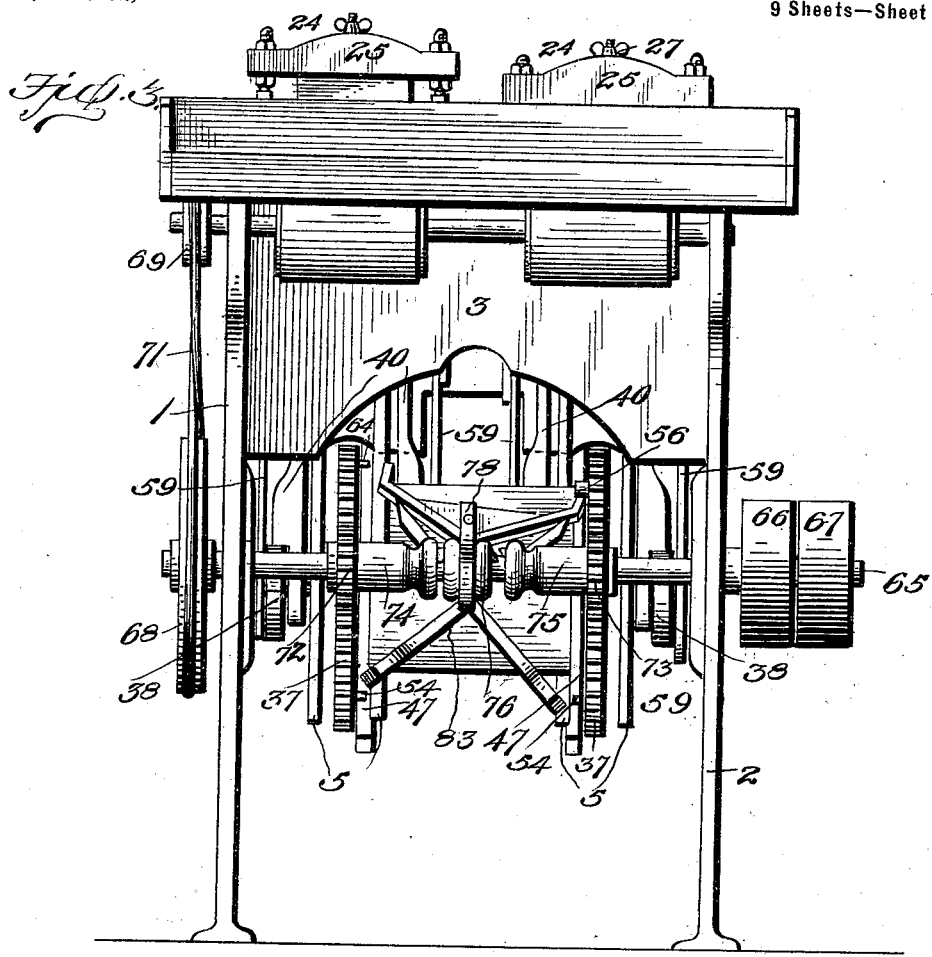
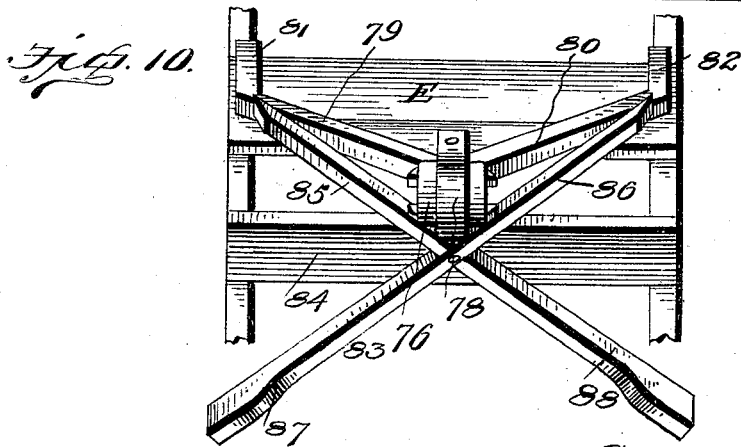
Witnesses
Inventor
George T. Lester
By H. R. Willson & Co.
Attorneys No. 683,951. Patented Oct. 8, 1901.
G. T. LESTER.
PLUG TOBACCO MACHINE.
(Application filed May 21, 1901.)
(No Model.) 9 Sheets—Sheet 4.

Witnesses
Inventor
George T. Lester
By H. B. Willson & Co.
Attorneys

No. 683,951. Patented Oct. 8, 1901.
G. T. LESTER.
PLUG TOBACCO MACHINE.
(Application filed May 21, 1901.)
(No Model.) 9 Sheets—Sheet 5.
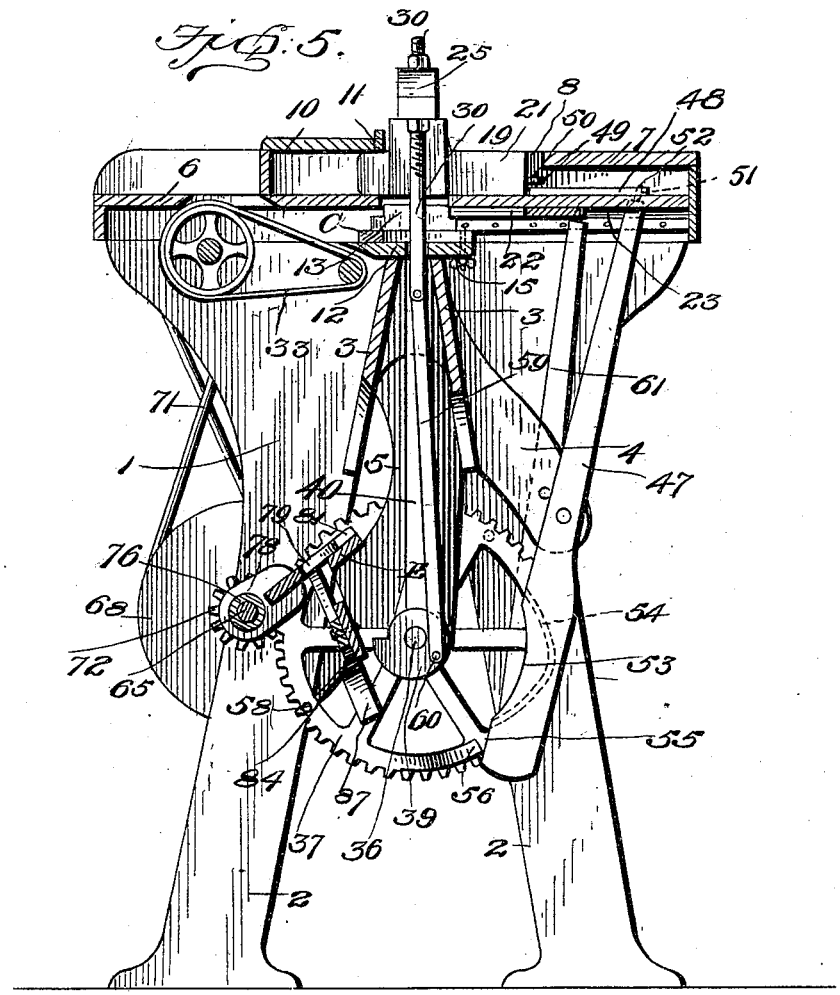
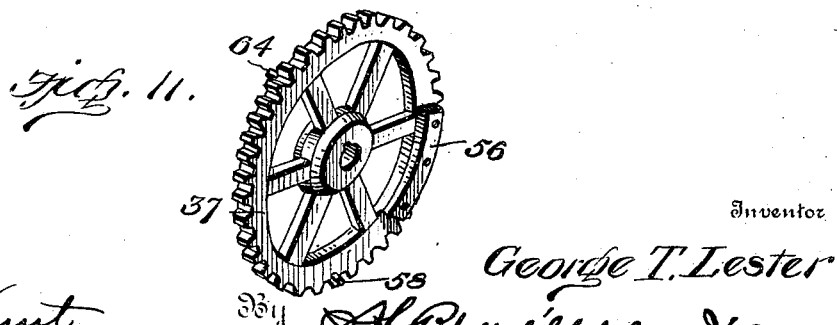
Witnesses
Inventor
George T. Lester
By
Attorneys No. 683,951. Patented Oct. 8, 1901.
G. T. LESTER.
PLUG TOBACCO MACHINE.
(Application filed May 21, 1901.)
(No Model.) 9 Sheets—Sheet 6.
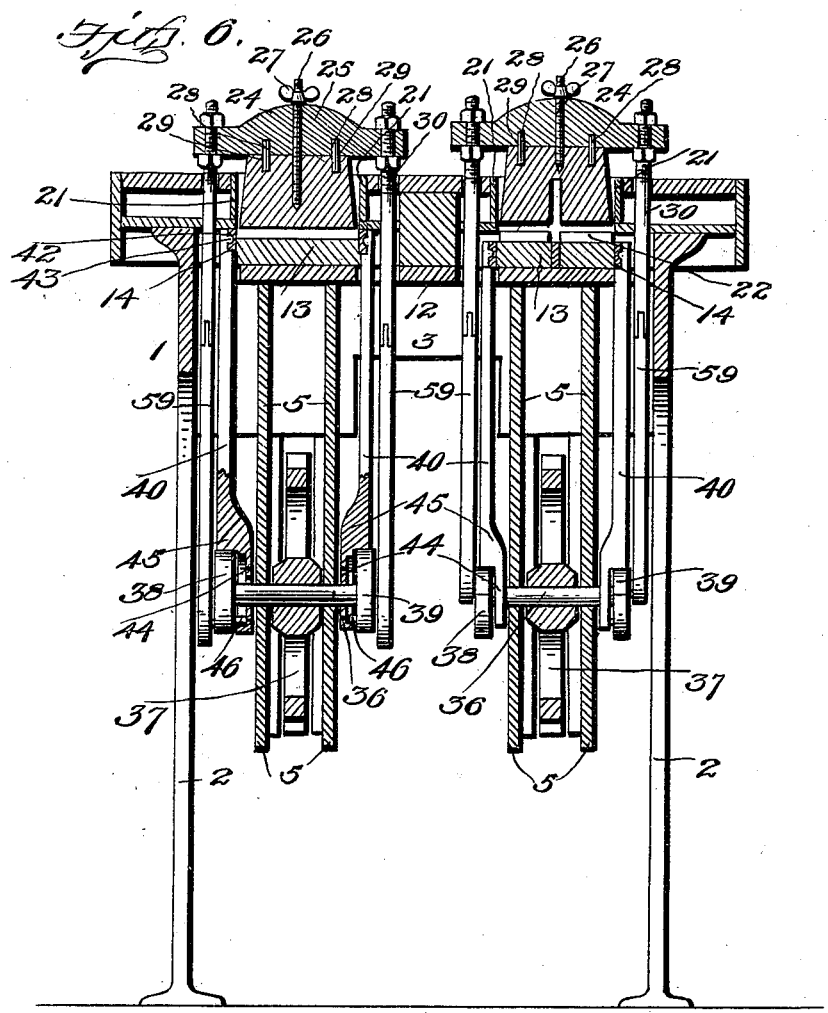
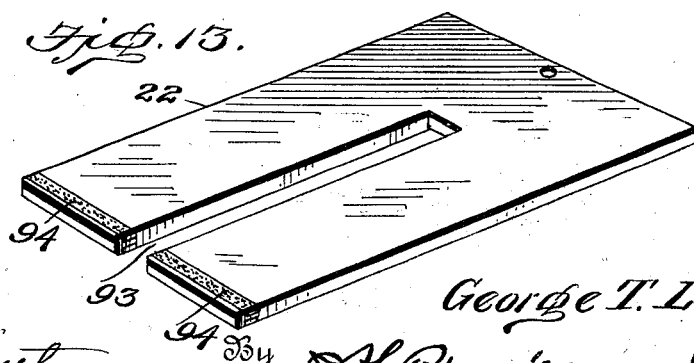
Inventor
George T. Lester
Witnesses
Attorneys No. 683,951. Patented Oct. 8, 1901.
G. T. LESTER.
PLUG TOBACCO MACHINE.
(Application filed May 21, 1901.)
(No Model.) 9 Sheets—Sheet 7.

Inventor
George T. Lester
By
Attorneys

Witnesses

No. 683,951. Patented Oct. 8, 1901.
G. T. LESTER.
PLUG TOBACCO MACHINE.
(Application filed May 21, 1901.)
(No Model.) 9 Sheets—Sheet 8.
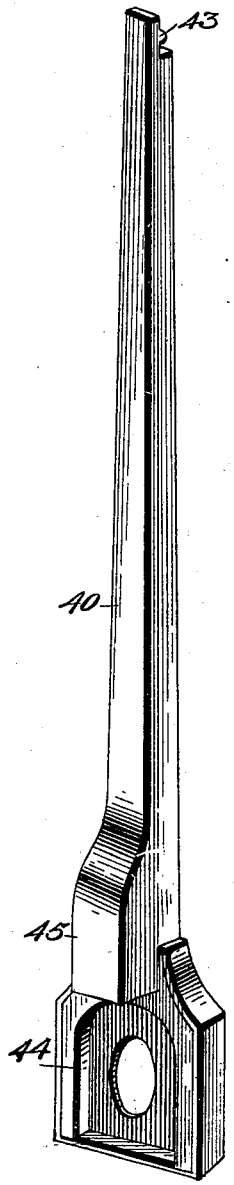
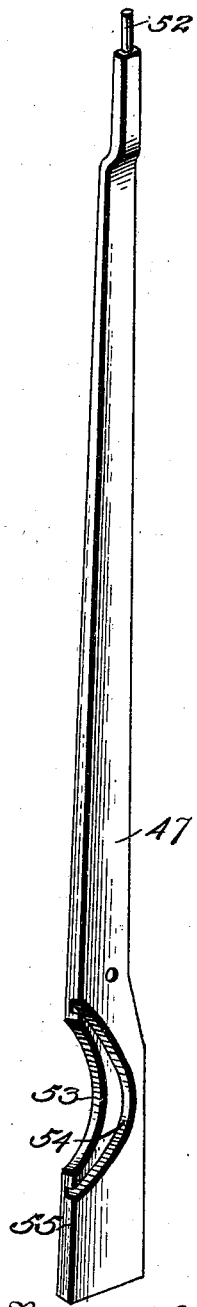
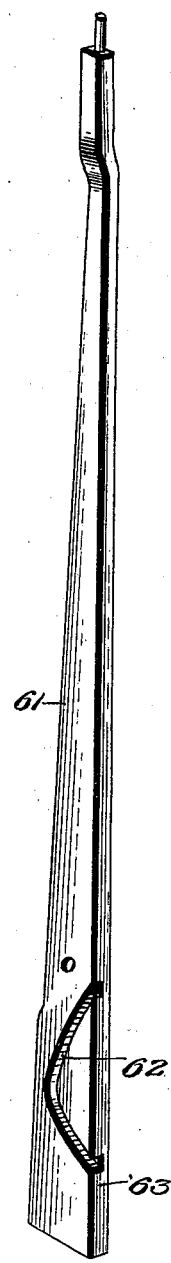

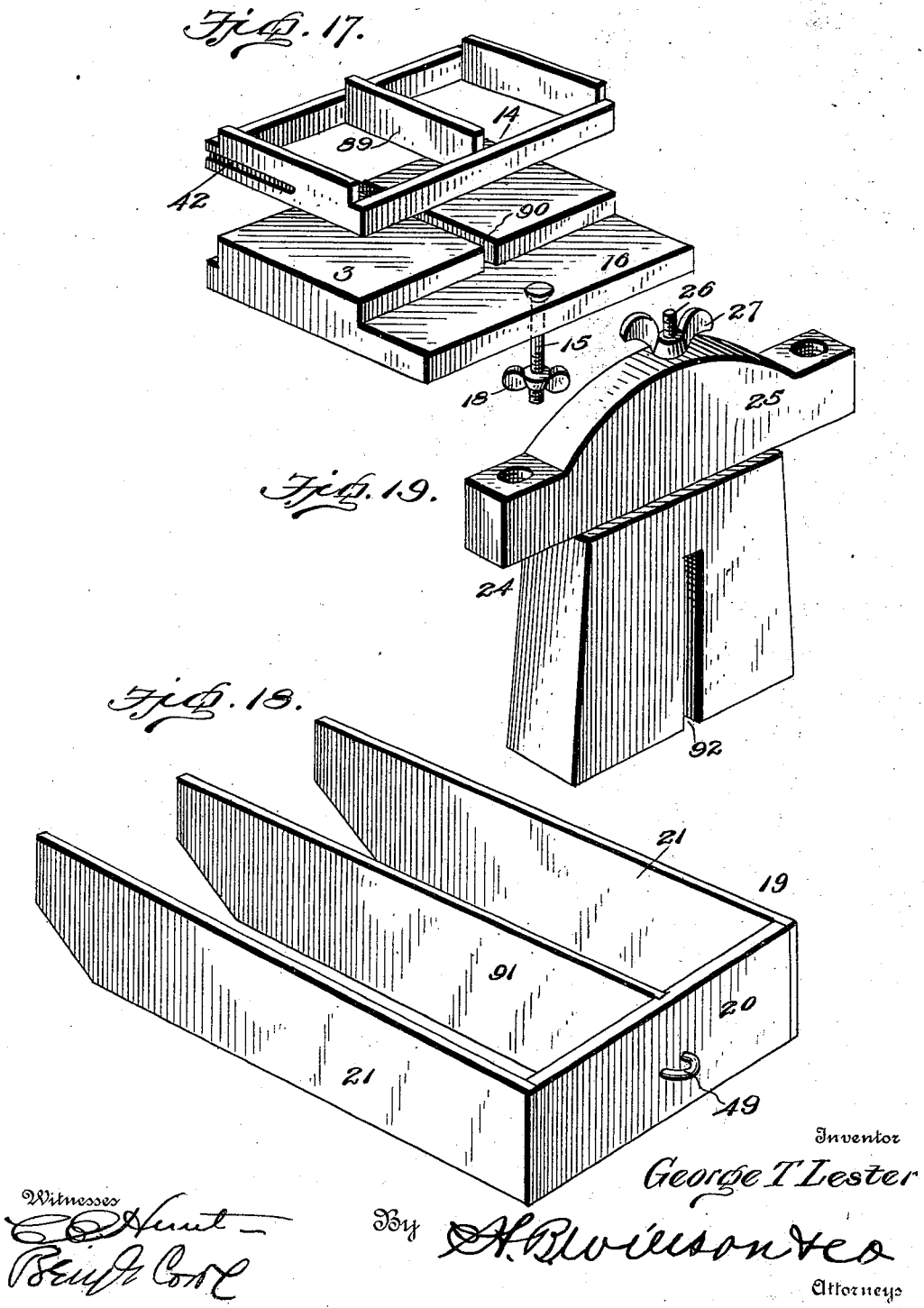

UNITED STATES PATENT OFFICE.

GEORGE T. LESTER, OF DYER STORE, VIRGINIA.

PLUG-TOBACCO MACHINE.

SPECIFICATION forming part of Letters Patent No. 683,951, dated October 8, 1901.

Application filed May 21, 1901. Serial No. 61,262. (No model.)

*To all whom it may concern:*

Be it known that I, GEORGE T. LESTER, a citizen of the United States, residing at Dyer Store, in the county of Henry and State of Virginia, have invented certain new and useful Improvements in Plug-Tobacco Machines; and I do declare the following to be a full, clear, and exact description of the invention, such as will enable others skilled in the art to which it appertains to make and use the same.

The invention relates to a plug-tobacco machine designed more particularly for giving the initial pressure to the filler or body of the plug before the binder or wrapper is put on and for discharging said plugs continuously and consecutively from the machine without lessening, breaking, or destroying in any way the integrity of the plug, which after being provided with a wrapper and dried is subjected to a heavy final pressure in another machine.

The object of the invention is to provide a machine of this character which shall be simple of construction, durable in use, comparatively inexpensive of production, efficient in action, and which may be easily and quickly changed to press plugs into different forms or sizes.

With these and other objects in view, the invention consists of certain novel features of construction, combination, and arrangement of parts, which will be hereinafter more fully described, and particularly pointed out in the appended claims.

Figure 4:
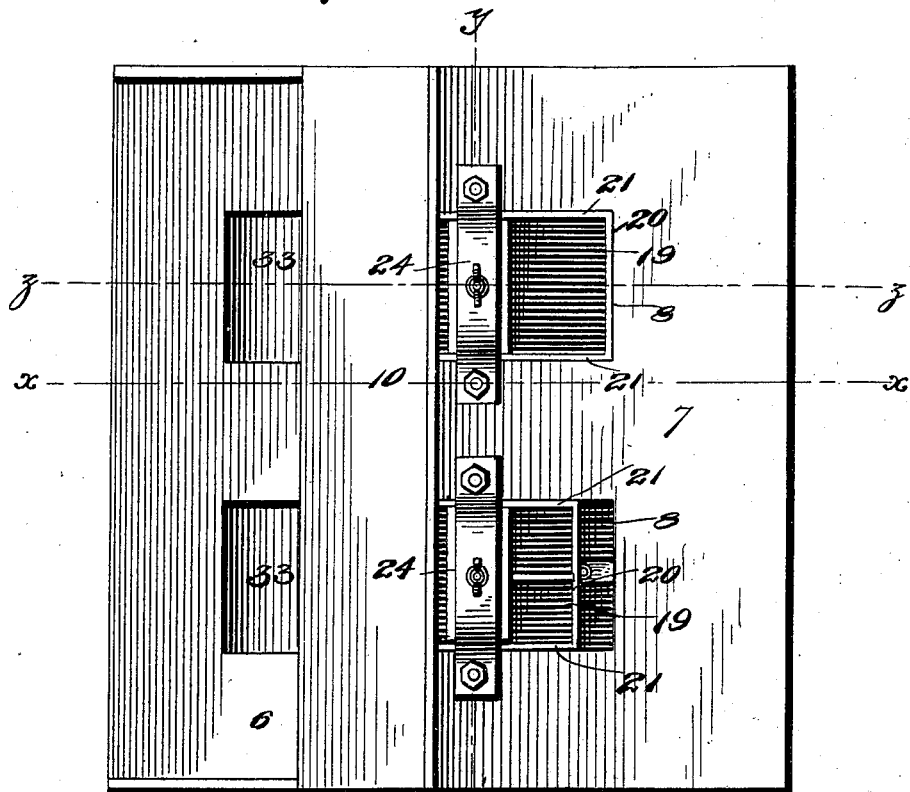
Figure 9:
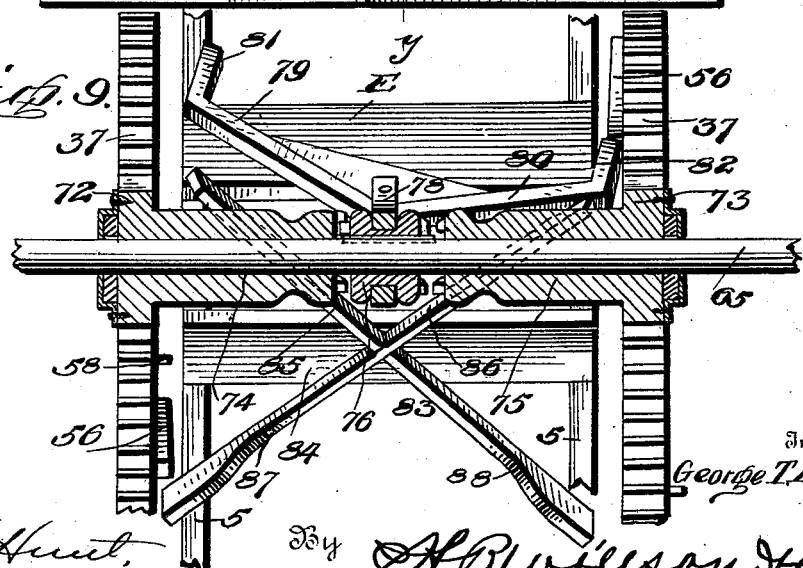
Figure 7:
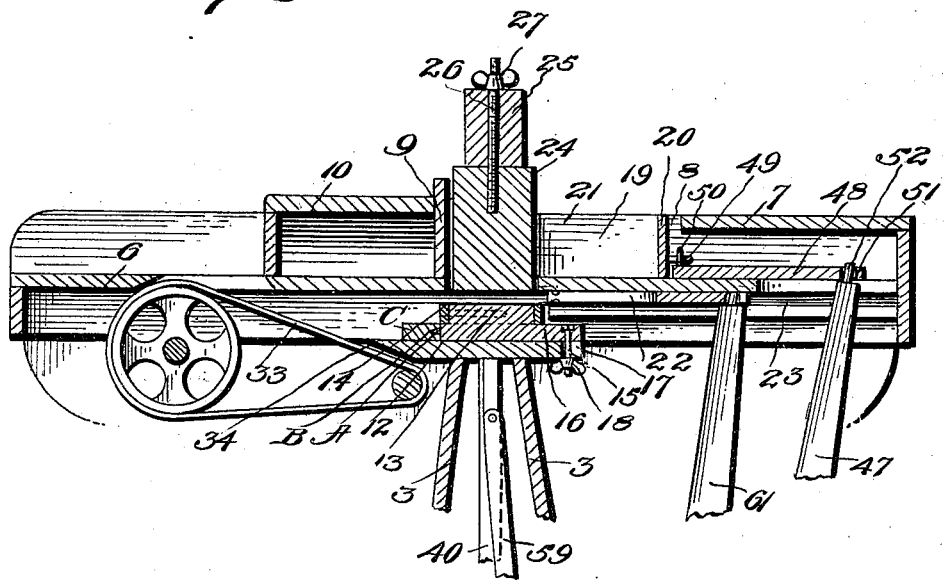
Figure 8:
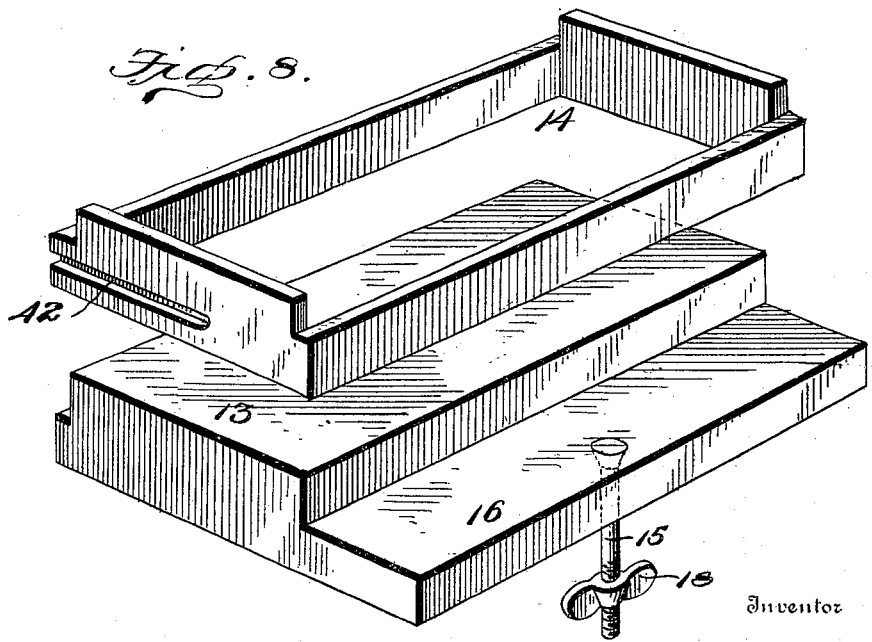

In the accompanying drawings, Figure 1 is a rear perspective view of the complete machine. Fig. 2 is a front elevation of the same with parts shown in section. Fig. 3 is a rear view of the machine. Fig. 4 is a top plan view. Fig. 5 is a longitudinal vertical sectional view on line $xx$, Fig. 4. Fig. 6 is a transverse sectional view on line $yy$, Fig. 4, showing the plunger at one side of the machine in its elevated position and the plunger at the other side of the machine in its depressed position. Fig. 7 is a vertical sectional view on line $zz$, Fig. 4. Fig. 8 is a perspective view of one style of mold-box, the parts being shown separate. Fig. 9 is a vertical longitudinal sectional view through the parts mounted on the main drive-shaft. Fig. 10 is a front view of the clutch-shipper and its actuating-lever. Fig. 11 is a perspective view of one of the master-gears. Fig. 12 is a similar view of one of the cams. Fig. 13 is a similar view of one of the ejectors. Fig. 14 is a perspective view of one of the mold-box-operating bars. Fig. 15 is a similar view of one of the feeder-actuating levers. Fig. 16 is a similar view of one of the ejector-actuating levers. Fig. 17 is a perspective view of a mold-box for forming two plugs at one operation of the plunger, the parts of the mold-box being shown separated. Fig. 18 is a similar view of one of the feeders to coöperate with said mold-box, and Fig. 19 is a similar view of one of the coacting plungers.

In the drawings, 1 denotes the main frame of the machine, consisting of vertical standards or side pieces 2, connected at their upper ends by cross-pieces 3, one of which has downwardly and forwardly projecting arms 4. Two sets of hanger-arms 5 project downwardly from between the cross-pieces 3 and support the operating-shafts hereinafter referred to.

6 denotes the table, secured to the upper ends of the vertical side pieces or standards. Supported over the front portion and extending the full width thereof is a shelf 7, having feed-openings 8 and a vertical partition 9, Fig. 7, to the rear of which is arranged an inclosing hood 10. The partition 9 is formed with vertical slots 11, Fig. 5, for the purpose of permitting of the reciprocation of the feeders under the plungers, as hereinafter explained.

12 denotes a platform fixed to or cast integral with the upper edges of the cross-pieces 3 and is designed to support the mold-boxes. Each mold-box consists of a stationary bottom 13, Figs. 7 and 8, and a surrounding vertically-movable frame 14. Each mold-box is secured to the platform 12 by a bolt 15, which extends through a hole in the ledge 16 of the bottom 13 and through a slot 17 in the edge of the platform and is provided with a tightening-nut 18. The rear edge of the stationary bottom has points or prongs A, which project into sockets B, formed in a cleat C, secured to the platform 12. This construction permits of the quick removal of the mold for purposes of repair or when it is desired to replace it with one of a different shape, size, or design.

19 denotes feeders, each of which has a reciprocatory movement upon the table 6 and may be charged with tobacco through the feed-openings 8. Each of these feeders consists of an end piece 20 and side pieces 21, the rear ends of which extend through the slots 10 of the partition 9, and thus guide the feeders in their sliding movement as the feeder, with its charge of tobacco, moves over the mold-box.

24 denotes plungers designed to coöperate with the mold-boxes. The plungers are connected to cross-heads 25 by bolt 26 and nut 27 and are prevented from turning with respect to said heads by studs 28, Fig. 6, which project over the plunger into sockets 29, formed in the under side of the cross-heads. Each cross-head has connected to its ends rods 30, which extend through the shelf and table of the machine and operate in a manner hereinafter described. The connection of the rods with the cross-heads is such as to permit of the vertical adjustment of said cross-heads on said rods to limit the vertical movement of the plungers to which the cross-heads are attached, and thereby vary the degree of pressure upon the tobacco acted upon. Tightening-nuts 31 and jam-nuts 32, Fig. 2, are shown in the present instance as the means for effecting this adjustment.

22 denotes ejectors mounted to slide on suitably-mounted tracks 23. These ejectors move beneath the table 6 and are designed to eject the compressed plugs from the mold-boxes.

In operation the tobacco is weighed and placed into one of the feeders, which moves it onto the mold-box bottom under the elevated plunger. The movable frame of the mold-box is now elevated, and about the same time the plunger begins to descend and continues its downward movement between the sides and end of the feeder and the partition 9 into the mold-box. A slight pause or halt in the movement of the plunger now takes place, so as to temporarily hold the plug under compression, and thereby cause it to retain its shape when pressure has been removed. As soon as the plunger enters the mold-box the feeder is retracted and is in position to be refilled with a fresh charge of tobacco, which is done while the plunger is holding the plug under compression. After the plug has been held under compression a predetermined period of time the plunger and movable frame of the mold-box are simultaneously moved in opposite directions, the former upwardly and the latter downwardly, until its upper edge is flush with the bottom of the mold-box, and at this instant the ejector is shot rearwardly to throw the plug off the mold-box bottom and is instantly retracted. The plunger having been elevated and the frame of the mold-box lowered, the feeder, with its fresh charge of tobacco, now moves over the mold-box and under the plunger and the operation just described repeated to form another plug. After having been discharged from the mold-box bottom by the ejector the compressed plug falls upon an endless apron or conveyer 33, the upper run of which is on an incline and moves into contact with the end wall 34 and the opening at each side of the machine near the rear end of the table, so that the plug is thrown or discharged upon said table and may be gathered therefrom for the purpose of putting on a binder or wrapper.

I shall now proceed to describe the mechanism for operating the movable frame of the mold-box, and as this mechanism is duplicated on each side of the machine a description of one will answer for that of the other.

Journaled in the lower ends of the arms 5 (see Fig. 6) is a shaft 36, having fixed to it a toothed master-wheel 37 and cams 38 and 39. 40 denotes the bars for elevating and lowering the movable frame of the mold-box. The ends of the movable frame of the mold-box are provided with transverse grooves 42, Fig. 8, which are engaged by laterally-projecting tongues 43, formed at the upper ends of the bar 40. These grooves are open at the rear ends to permit of the withdrawal in a forward direction of the mold-box from engagement with the tongues of said bars when it is desired to substitute a mold-box of a different form or size. It will of course be understood that the nut 18 is loosened to permit the bottom of the mold-box to be moved forwardly with the movable frame thereof. The lower ends of the bars 40 are provided with yokes 44 and also with an offset 45. The bars of the mold-box are elevated in unison by the cams 39 engaging the offsets 45, and while their weight would in most cases cause them, with their connected mold-box frame, to descend I prefer to provide a positive means for effecting this, and to that end employ pins 46, projecting laterally from the inner faces of the cams and engaging the yokes 44. It will thus be seen that the rotary movement of the operating-shaft 36 is converted into a reciprocatory movement and this movement transmitted to the movable frame of the mold-box for reciprocating it.

The feeders hereinbefore referred to are operated in the following manner, and as the mechanism for operating each feeder is the same a description of one will answer for that of the other. Pivoted to one side of the arm 4 is a lever 47, (see Figs. 2 and 5,) the upper end of which is connected by a link 48 to the feeder, preferably by providing the forward end of the feeder with a staple 49, which is engaged by a pin 50, projecting upwardly from the rear end of said link and forming the forward end of said link with an eye 51, which is engaged by a pin 52, projecting upwardly from the end of the lever 47. The master-wheel is mounted directly under the longitudinal center of the feeder, and in order to connect the upper end of the lever to the longitudinal center portion of the feeder the said end is offset, as shown in Figs. 2 and 15. The rear edge of the lever 47 below its pivotal point is provided with a curved recess 53, and the outer side of said lever is provided with a cam-groove 54. The rear edge of said lever below the recess 53 is straight, as shown at 55. The master-wheel 37, Fig. 11, is provided on its inner face, near its periphery, with a segmental concentric block 56 and with a short pin 58, projecting laterally and arranged at a distance from said block. Assuming the feeder to have just been charged with tobacco, the rotation of the master-wheel will first bring the block 56 against the straight edge 55 of the lever and force the lower end of said lever forwardly and the upper end of said lever rearwardly, with its attached feeder, over the mold-box and under the plunger. The instant the block rises from engagement with the straight portion 55 of the lever its curved edge engages the curved recess 53 and temporarily holds the lever in its shifted position, with the feeder inclosing the plunger during the movement of the plunger downwardly into the mold-box, and the movable frame of the mold-box reaches the limit of its upward stroke before the plunger begins to descend into the mold-box, and by the shape of the cam the mold-box frame remains in its elevated position until the plunger has reached the limit of its downstroke, at about which instant the pin 58 of the master-wheel engages the cam-groove 54 of the lever 47, swings the lower end of said lever rearwardly and the upper end forwardly, and thus withdraws the feeder from the mold-box in a position to be recharged with tobacco to supply the mold-box.

I will now proceed to describe the mechanism for operating the plungers, and as this mechanism is duplicated on each side of the machine a description of one mechanism will answer for that of the other. 59, Figs. 3 and 5, denotes pitmen connected at their upper ends to the bars 30 of the cross-head and at their lower ends to crank-pins 60, projecting from the sides of the cams 39. As the cams rotate, as previously described, said pitmen will be reciprocated, thus lowering and raising the cross-head, with its attached plunger, into and out of the mold-box.

I will now proceed to describe the mechanism for operating the ejectors, and as each mechanism for each ejector is the same a description of one will answer for that of the other. 61, Figs. 16 and 5, denotes a lever pivoted to the outer face of the arm 4 and having a pin-and-slot connection at its upper end with the forward end of the ejector and provided at its lower end below its pivotal point with the arm 4, with a cam-groove 62, and having a straight rearward edge 63. After the tobacco has been depressed by the plunger and at the instant the mold-box frame descends and its upper edges become flush with the bottom of said box a pin 64, Fig. 11, projecting laterally from the face of the master-wheel, strikes the straight edge 63 of the lever 61 and suddenly throws the lower end of said lever forwardly and the upper end rearwardly with its ejector, which ejector knocks the compressed plug off the bottom of mold-box onto the endless conveyer in a manner previously described. The pin 64 next rides into the cam-groove 62 and retracts or withdraws the ejector from over the mold-box bottom.

The machine thus described is what might be properly termed a "duplex" machine, the tobacco being fed to the mold-boxes alternately and the plugs discharged therefrom in a like manner. While the plug is being compressed in the mold-box at one side of the machine, the mold-box at the other side of the machine is in condition to receive a charge of tobacco. To operate these two different sets of tobacco-compressing devices in alternation, I provide a novel form of mechanism, which I will now proceed to describe.

65 denotes the main drive-shaft, provided with loose and fixed pulleys 66 and 67, respectively, at one end and with a pulley 68 at the opposite end. The pulley 68 is connected to pulleys 69 and 70, fixed to the ends of the rollers of the endless conveyer 33 by a cross-belt 71 to drive said conveyer. 72 and 73 denote drive-pinions loosely mounted on said shaft 65 and meshing with the master-wheel 37. Clutch members 74 and 75 are fixed to these drive-pinions, preferably cast integral therewith, and are also loose upon said shaft. 76 denotes a clutch-head keyed to said shaft to rotate therewith and slide longitudinally thereon to alternately engage and lock the clutch members to said shaft to rotate in unison therewith. The clutch-shipper consists of a head-block 78, which fits an annular groove in the clutch-head and permits of the free rotation of said clutch-head. Pivoted to the head-block, to swing or rock transversely of said head-block, are two rigidly-connected forked arms 79 and 80, the extremities 81 and 82 of which project an angle to the length of the arms and rest or are supported upon a shelf E and are adapted to be alternately brought within the path of movement of the segmental blocks 56 of the master-wheels.

83 is a shipper-operating lever, preferably in the form of the letter X, pivoted to a cross-piece 84, secured to the lower ends of the arms 5, and having its arms 85 and 86 projecting upwardly and adapted to coact with the forked arms 79 and 80 and having its arms 87 and 88 projecting downwardly and adapted to be alternately engaged by the segmental blocks of the master-wheels.

Referring to Fig. 9 and assuming that the drive-shaft is in operation and the plungers at their lowest point in their respective boxes and the arm 82 of the shipper located in the path of movement of the block of the master-wheel with which it engages, the instant the end of the block strikes the end 82 of the arm 80 said arm is rocked to shift the shipper-head to disengage the clutch-head from the clutch member 75, thus instantly bringing that side of the machine operated by the master-wheel just described to a full stop, thus leaving the tobacco under pressure of the plunger, which is allowed to remain within the mold-box a predetermined period, as hereinbefore described. At the instant the clutch-head is disengaged from the clutch member 75 it is engaged with the clutch member 74, which causes said member 74 and its connected drive-pinion to rotate with the drive-shaft, and this rotary movement of the drive-shaft is transmitted to the other master-wheel, which in rotating will bring its segmental block into engagement with the arm 87 of the X-lever, thus rocking said lever and causing its arm 86 to engage the arm 80 and remove it from engagement with and out of the path of movement of the segmental block of the master-wheel, which has been brought to a period of rest. This movement of the arm 82 out of the path of movement of the segmental block is permitted by reason of the fact that the clutch-head 76, even while locked to the clutch member 74, has a slight lateral movement on the shaft 65 toward said clutch member, and thereby permits the arm 82 to free itself from its coacting segmental block when said arm is knocked upwardly by the arm 86 of the X-lever. In throwing the arm 80 to one side of the path of movement of the block with which it coacts the other arm 79 is thrown into the path of movement with the block with which it coacts. Now upon a further rotation of the master-wheel its block will be brought into engagement with the end 81 of the arm 79 and the wheel will be automatically stopped and the clutch-head shifted to cause the rotation of the opposite master-wheel. It will thus be seen that the compressing devices are worked alternately and that each plug within the mold-box is allowed to remain therein under compression a predetermined period of time, so as to prevent it from swelling or becoming otherwise distorted.

From the foregoing description, taken in connection with the accompanying drawings, the construction, mode of operation, and advantages of my invention will be readily understood without requiring a more extended explanation.

Various changes in the form, proportion, and details of construction may be made within the scope of the invention without departing from the spirit or sacrificing any of the advantages thereof. For instance, if it be desired to press two plugs instead of one at each stroke of the plunger I will change the mold-box, the feeder, and the plunger, as shown in Figs. 17, 18, and 19, respectively, wherein the only change is the provision in the movable frame of the mold-box of a partition 89 and in the bottom of the mold-box of a receiving-groove 90, in the feeder of a central strip 91, and in the plunger of a vertical slot 92. The ejector is constructed with a longitudinal slot 93, so that it may straddle the partition 89 when it is shot rearward to eject a plug from off the bottom of the mold-box. If desired, the rear end of the ejector may be provided with a lubricating-strip 94 upon its upper and lower faces, which are adapted to contain a lubricant which will lessen friction and enable the ejectors to readily reciprocate. This strip also serves to prevent the licorice in the tobacco adhering to the bottom of the mold-box and lower face of the plunger, as these two surfaces are thoroughly lubricated by the said strip in the reciprocation of the ejector.

Having thus described my invention, what I claim, and desire to secure by Letters Patent, is—

1. In a plug-tobacco machine, the combination with a mold-box having vertically-movable sides, a coacting plunger and an ejector, of means for elevating the sides of the mold-box, means for forcing the plunger downward within the mold-box when the sides thereof are elevated, means for lowering the sides of the mold-box, and means for actuating the ejector after the sides of the mold-box have been lowered to eject the plug from the bottom of said box, substantially as set forth.

2. In a plug-tobacco machine, the combination with the mold-box having vertically-movable sides, a feeder for filling said mold-box, a plunger coacting with said mold-box and an ejector, of means for elevating the sides of said mold-box, means for actuating the feeder to fill the mold-box when the sides thereof have been elevated, means for drawing the plunger down into the mold-box after it has been filled, means for lowering the sides of the mold-box after the material therein has been compressed, and means for actuating the ejector to remove the compressed material from the bottom of said mold-box, substantially as set forth.

3. In a plug-tobacco machine, the combination with a mold-box consisting of a bottom and vertically-movable sides, of a feeder to supply said mold-box with material to be compressed, a plunger to compress said material within said mold-box, an ejector for ejecting the compressed material from said mold-box, and means for moving the sides of the mold-box out of the path of movement of the ejector to permit said ejector to move over the bottom of the mold-box, substantially as set forth.

4. In a plug-tobacco machine, the combination with a mold-box having a bottom and sides, said sides being movable to bring the upper edges of two of the same flush with said bottom, a coacting plunger, said plunger being vertically adjustable, whereby the pressure upon the material may be varied, and an ejector for working across the bottom of the mold-box after the sides have been moved out of the path of movement of the ejector, of means for elevating the sides of the mold-box, means for forcing the plunger downward within the mold-box when the sides thereof are elevated, means for lowering the sides of the mold-box out of the path of movement of the ejector, and means for actuating the ejector after the sides of the mold-box have been lowered to eject the plug from the bottom of said box, substantially as set forth.

5. In a plug-tobacco machine, the combination with a mold-box consisting of a bottom and movable sides, of a feeder to supply said mold-box with material to be compressed, a plunger to compress said material within said box, means for moving the sides, an ejector for ejecting said compressed material from the bottom of said mold-box after the sides have been moved out of the path of movement of the ejector, and a conveyer located at the rear of the machine within the path of movement of the compressed plug to receive said plug after it has been ejected from the mold-box and convey it to a point for further treatment or preparation, substantially as set forth.

6. In a plug-tobacco machine, the combination with a removable mold-box having vertically-movable sides, a removable coacting plunger and an ejector, of means for elevating the sides of the mold-box, means for forcing the plunger downward within the mold-box when the sides thereof are elevated, means for lowering the sides of the mold-box, and means for actuating the ejector after the sides of the mold-box have been lowered to eject the plug from the bottom of said box, substantially as set forth.

7. In a plug-tobacco machine, the combination with a mold-box having vertically-movable sides, a vertically-movable plunger to coöperate with said mold-box, a sliding feeder to supply material to the mold-box and an ejector to eject the compressed material from the mold-box, of an actuating-shaft, a master-wheel fixed thereto having projections thereon, cams fixed to said shaft having crank-pins thereon, links connecting said plunger with said crank-pins on said cams, rods connected to said mold-box and actuated by said cams to raise and lower said mold-box, levers loosely connected to said ejector and feeder and located within the path of movement of said projections carried by the master-wheel for reciprocating said ejector and said feeder, substantially as set forth.

8. In a plug-tobacco machine, the combination with a mold-box, having vertically-movable sides, and its coöperating plunger, a feeder for supplying material to the mold-box, an ejector for ejecting the compressed material, of an operating-shaft, a master-wheel provided with a concentric segmental block and a pin on one face and with a pin projecting from its opposite face, cams mounted on said shaft and having crank-pins thereon, pitmen connecting the plunger to said crank-pins on the cams, bars having their upper ends connected to the movable sides of the mold-box, the lower ends connected to said cams to be reciprocated thereby, levers having their upper ends loosely connected to the feeder and ejector, one of said levers being provided with a curved recess and a straight portion, and with a groove in its side, said straight portion and recess adapted to be engaged by the block, the groove by one of the pins, and the other lever being provided with a straight portion and with a groove, said straight portion and groove adapted to be engaged by the other pin, substantially as set forth.

9. In a plug-tobacco machine, the combination with the compressing devices arranged side by side, of the master-wheels for actuating the compressing devices, a drive-shaft, drive-pinions mounted upon said shaft, a clutch device for locking the pinions to said shaft to rotate therewith, and means for automatically shifting the clutch device for alternately throwing into and out of gear the master-wheels, substantially as set forth.

10. In a plug-tobacco machine, the combination with a mold-box having vertically-movable sides, a coacting plunger and an ejector, of means for elevating the sides of the mold-box, means for forcing the plunger downward within the mold-box when its sides are elevated, means for lowering the sides of the mold-box, means for actuating the ejector after the sides of the mold-box have been lowered to eject the plug from the bottom of said box, and a lubricator actuated by the ejector for lubricating the opposing faces of the mold-box bottom and plunger, substantially as set forth.

In testimony whereof I have hereunto set my hand in presence of two subscribing witnesses.

GEORGE T. LESTER.

Witnesses:
H. B. WILLSON,
BENJ. G. COWL.